United States Patent
Ertmer et al.

(10) Patent No.: US 8,536,488 B2
(45) Date of Patent: Sep. 17, 2013

(54) ELEVATED WELDING-TYPE CABLE SUPPORT SYSTEM

(75) Inventors: Jonathan R. Ertmer, Greenville, WI (US); Chris J. Roehl, Appleton, WI (US); John C. Breitbach, Greenville, WI (US); Thomas G. Yunk, Shiocton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 1502 days.

(21) Appl. No.: 11/567,359

(22) Filed: Dec. 6, 2006

(65) Prior Publication Data

US 2008/0135533 A1    Jun. 12, 2008

(51) Int. Cl.
*B23K 37/00* (2006.01)
*B23K 9/32* (2006.01)
*B23K 9/12* (2006.01)

(52) U.S. Cl.
CPC . *B23K 9/32* (2013.01); *B23K 9/123* (2013.01); *B23K 9/328* (2013.01)
USPC ............................ 219/136; 219/137.9; 266/77

(58) Field of Classification Search
USPC .................... 219/137.9, 139; 248/51, 52, 63, 248/79, 89, 90
See application file for complete search history.

(56) References Cited

U.S. PATENT DOCUMENTS

| | | | |
|---|---|---|---|
| 2,866,076 A | 12/1958 | Aversten | |
| 3,237,051 A | 2/1966 | Schober | |
| 3,242,311 A * | 3/1966 | Rutherford | 219/137.9 |
| 4,294,481 A | 10/1981 | Pearl | |
| 4,573,665 A | 3/1986 | Strohl et al. | |
| 4,584,442 A | 4/1986 | Shields et al. | |
| 4,625,949 A | 12/1986 | Walker | |
| 4,700,830 A * | 10/1987 | O'Brien | 206/229 |
| 4,926,024 A | 5/1990 | Mann | |
| 5,941,619 A * | 8/1999 | Stieben et al. | 312/223.6 |
| 6,396,019 B1 | 5/2002 | Williams | |
| 6,588,052 B2 * | 7/2003 | Iversen | 15/323 |
| 6,596,972 B1 | 7/2003 | Di Novo et al. | |
| 6,930,282 B1 | 8/2005 | Di Novo et al. | |
| 6,992,266 B1 | 1/2006 | Di Novo et al. | |

\* cited by examiner

*Primary Examiner* — Henry Yuen
*Assistant Examiner* — Thien S Tran
(74) *Attorney, Agent, or Firm* — Quarles & Brady, LLP

(57) ABSTRACT

A cable management system for a welding-type system includes a support column extending in a first direction from a first end supported by a welding-type device to a second end arranged above the welding-type device. The cable management system also includes a cable support arranged on the second end of the support column that extends in a second direction substantially transverse to the first direction. Accordingly, a portion of the cable support extends away from the welding-type device to allow a cable supported thereon to extend below the cable support and proximate to the welding-type device.

5 Claims, 3 Drawing Sheets

ELEVATED WELDING-TYPE CABLE SUPPORT SYSTEM

REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates generally to welding cable management systems and, more particularly, to a system for supporting and storing a welding-type cable and welding-type gun in an elevated position.

Welding-type systems, such as welders, plasma cutters, and induction heaters, typically include a gun or torch that is tethered to a power supply through a cable. In many cases, the cable is designed to span many feet to enable an operator to move the gun or torch to a variety of work areas without needing to move the power supply. While a lengthy cable is often included to provide an operator with a large amount of latitude, an overly lengthy cable can hinder mobility. That is, during operation, the slack cable rests about the area where the operator is located and can present an obstacle to mobility. Furthermore, the cable often serves as an impediment to easy storage and transportation of the welding-type device.

Accordingly, a variety of cable management systems have been developed for welding-type systems. The cable management systems are typically mounted to the housing of the welding-type device, a cart supporting the welding-type device, or similar structure. These cable management systems generally include a support structure from which to hang the cable when the welding-type device is in storage or being transported. Similarly, the support structure serves as a storage area for excess lengths of cable during use of the welding-type device. In addition to a cable support structure, some cable management systems include a gun or torch storage area that is also mounted to a welding-type device or surrounding structure. Accordingly, the gun or torch is protected from accidental damage when the welding-type device is not in use.

Unfortunately, even when these cable and/or torch storage and management systems are included, in operation, they often go unused. Operators often forego the process of storing the cable and torch after each use. Even more likely, operators fail to use these cable management systems during operation of the welding-type device.

In addition, even when these cable management systems are used, they have the potential to cause damage to the cable. As addressed above, most cable support structures are mounted to the housing of the welding-type device or surrounding structures, such as carts or gas bottles. Due to the location and specific configuration of the cable support structures, for example, a reel or set of pegs or hooks, the cables must be wrapped in a relatively small coil. The stress placed on the cable when being wrapped in a small coil, increases the risk that the liner of the cable will become kinked with respect to the conductive, gas flow paths, and/or feed ability of the wire located therein. Over time, these stresses can even cause premature wear on the cable. Accordingly, even when these cable management systems are properly used by operators to protect the cable and gun or torch from accidental damage, the cable management systems have the potential to induce premature failure of the cable.

Therefore, it would be desirable to have a system and method for managing the cables of a welding-type system that encourages consistent operator use and does not unduly stress or strain the cable during storage.

BRIEF SUMMARY OF THE INVENTION

The present invention overcomes the aforementioned drawbacks by providing a welding-type cable management system that allows an operator to interact with the cable in a more ergonomic position and, thus, encourages the operator to utilize the cable management system. Furthermore, the present invention provides a welding-type cable management system that facilitates storage of a cable in a relatively large coil that is less likely to cause premature wearing of the cable.

In accordance with one aspect of the present invention, a cable management system for a welding-type system is disclosed that includes a support column extending in a first direction from a first end supported by a welding-type device to a second end arranged above the welding-type device. The cable management system also includes a cable support arranged on the second end of the support column that extends in a second direction substantially transverse to the first direction. Accordingly, a portion of the cable support extends away from the welding-type device to allow a cable supported thereon to extend below the cable support and proximate to the welding-type device.

In accordance with another aspect of the present invention, a cable management system for a welding-type system is disclosed that includes a support column supported by a welding-type device and extending above the welding-type device. The cable management system also includes a cable support extending from the support column to present a surface configured to receive a cable extending from the welding-type device to be coiled thereabout and a receptacle supported by the support column and configured to receive a welding-type torch connected to the welding-type device through the cable.

In accordance with yet another aspect of the invention, a welding-type system is disclosed that includes a welding-type device having a housing and a support column supported by the housing of the welding-type device at a first end and extending to a second end arranged above the housing of the welding-type device. The welding-type system also includes a cable support extending from the support column to allow cables supported thereon to extend below the cable support and proximate to the housing of the welding-type device.

Various other features of the present invention will be made apparent from the following detailed description and the drawings.

BRIEF DESCRIPTION OF THE SEVERAL VIEWS OF THE DRAWINGS

The invention will hereafter be described with reference to the accompanying drawings, wherein like reference numerals denote like elements, and.

DETAILED DESCRIPTION OF THE INVENTION

Figure 1:
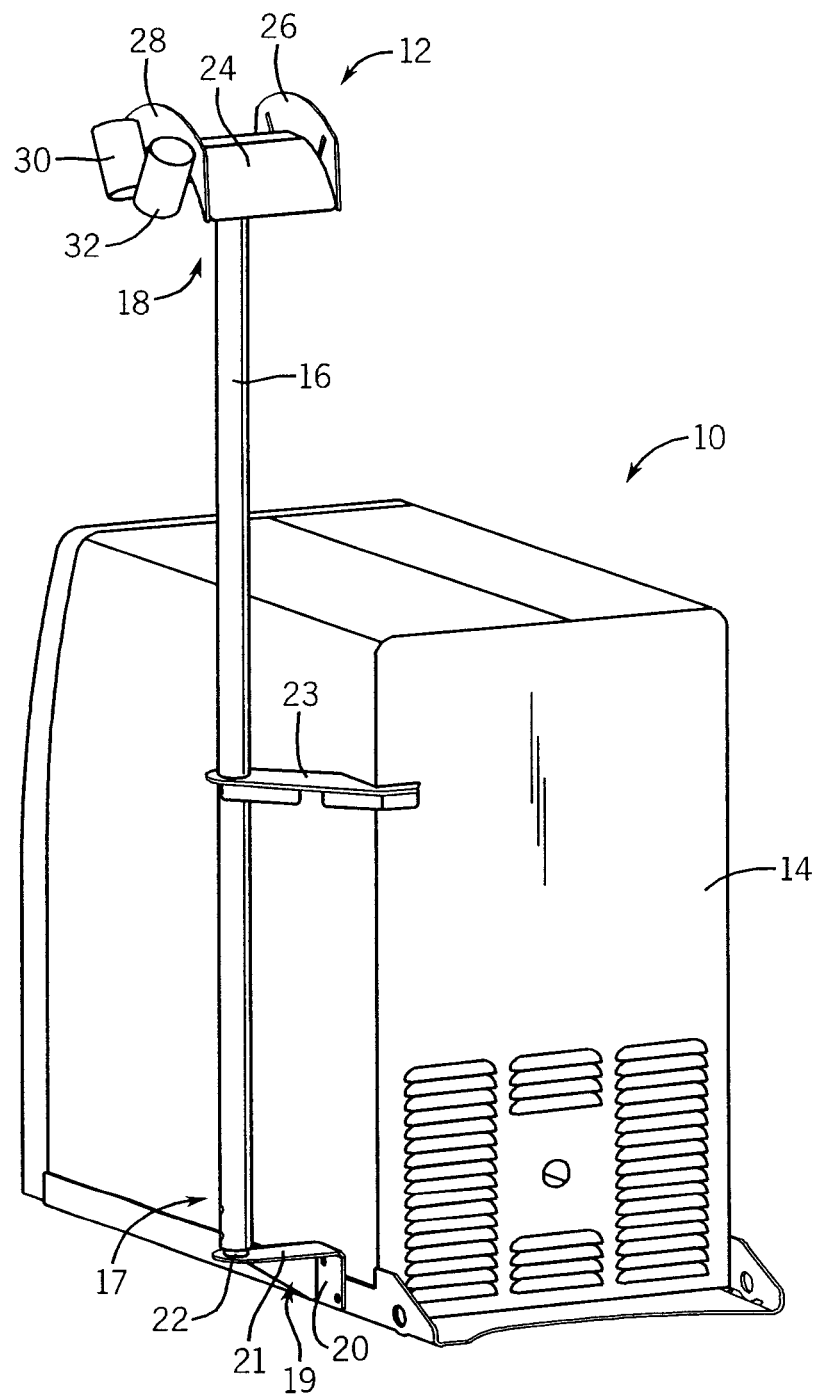
FIG. 1 is a perspective view of a welding-type system including a cable management system in accordance with the present invention.

Referring now to FIG. 1, a welding-type system 10 and associated cable management system 12 are shown. The welding-type system 10 includes a housing 14 that encases the components of a power source that is designed to deliver welding-type power. Reference to welding-type systems, welding-type devices, and welding-type power is used to describe systems and power that have operational characteristics similar to welding systems, such as induction heating systems, plasma cutting systems, and the like.

The cable management system 12 includes a support column 16 that is engaged with the housing 14 of the welding-type system 10 at a first end 17 through a mounting flange 19 and extends to a second end 18 that terminates above the housing 14 of the welding-type system 10. The mounting flange 19 includes a mounting face 20 that is fixed to the housing 14 and a support platform 21 forming a substantially planar surface that extends from the mounting face 20. A connection shaft 22 extends from the support platform 21 and is designed to extend into the support column 16. Hence, the mounting flange 19 serves to connect the support column 16 to the housing 14.

Arranged between the first end 17 and the second end 18 of the support column 16 is an optional bracket 23 that fastens the support column 16 to the housing 14 of the welding-type system 10 at a point located above the first end 17 of the support column 16. In the arrangement illustrated in FIG. 1, where the first end 17 of the support column 16 engages the housing 14 of the welding-type system 10 near the base of the housing 14, the bracket 23 provides additional strength and stability to the support column 16. However, additional configurations are contemplated where the first end 17 of the support column 16 engages the housing 14 in a position away from the base of the housing 14 and, thus, the bracket 23 may not be included.

A cable support 24 extends from the second end 18 of the support column 16. At its apex, the support 24 extends transversely to the support column 16. As will be described in detail below, the cable support 24 forms a saddle shape that facilitates coiling a cable supported on the cable support 24 in large coils designed to protect the cable against damage. Furthermore, as will be described, the cable support 24, at least partially, extends away from the housing 14 of the welding-type system 10 to allow cables supported thereon to extend below the cable support 24 and proximate to the housing 14 of the welding-type system 10.

Additionally, the cable support 24 includes opposing side walls 26, 28 that secure a coiled cable on the cable support 24. Mounted on one of the side walls 28 are a pair of receptacles 30, 32. It is contemplated that the pair of receptacles 30, 32 may be mounted on either side wall 26, 28 or may be mounted on opposite side walls 26, 28. Furthermore, it is contemplated that only one or even no receptacle 30 may be included in the cable management system 12.

Figure 2:
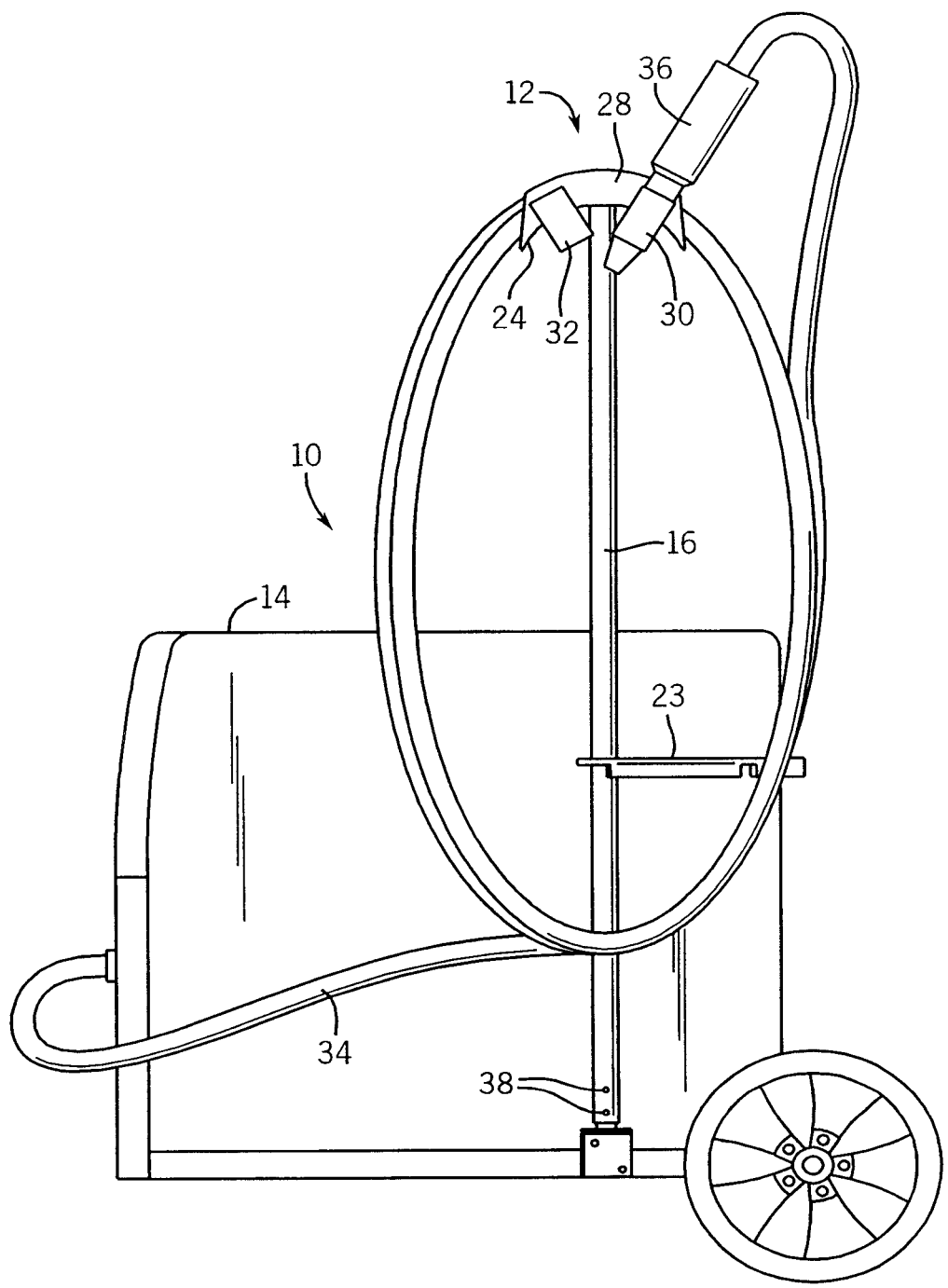
FIG. 2 is a side elevational view of the welding-type system and cable management system of FIG. 1.

Referring now to FIG. 2, the cable management system 12 is designed to receive a welding-type cable 34. The welding-type cable 34 extends from the welding-type system 10 and terminates at a welding-type gun or torch 36. As described above, the cable support 24 extends from the support column 16 to present a surface configured to receive the welding-type cable 34 in a coil extending thereabout.

By positioning the cable support 24 above and along the side of the housing 14, the welding-type cables 34, when arranged on the cable support 24, can extend below the cable support 24 and proximate to the housing 14 of the welding-type system 10. Accordingly, the welding-type cable 34 can be wrapped to form a relatively large coil, which protects the welding-type cable 34 against damage or lining kinks that are commonly induced when wrapping the welding-type cable 34 in a small or tight coil, such as caused when using traditional welding management systems that are mounted directly to the side of the housing 14.

In addition to providing sufficient space for the welding-type cable 34 to be wrapped in a relatively large coil, by arranging the cable support 24 above the housing, an operator can easily wrap the welding-type cable 34 around and unwrap the welding-type cable 34 from the cable management system 12. In particular, it is contemplated that the support column 16 is selected to arrange the cable support 24 in an ergonomic position. Specifically, it is contemplated that the cable support 24 is arranged at a height that is readily reached by an individual of average height when standing near the welding-type system 10. For example, it is contemplated that the cable support 24 is arranged at a height of between three and five feet above the base of the housing 14 of the welding-type system 10. Alternatively, if the welding-type system 10 includes feet or, as will be described below, wheels, it is contemplated that the cable support 24 is arranged at a height of between three and five feet above the lowest point of the feet or the wheels. Generally, it is contemplated that the cable support 24 is arranged at a height of between three and five feet above the ground. Accordingly, an operator is not discouraged from using the cable management system 12, as when cable management components are located in the significantly less ergonomic position of extending from the side of the housing 14 or other structures of similar height that require an individual to bend down to reach the components.

Similarly, by locating the receptacles 30, 32 at the same ergonomic position as the cable support 24, the welding-type torch or gun 36 is quickly and easily stored and retrieved. Hence, unlike storage systems that are designed to store the torch 36 along the side of the housing 14, which require repeated bending and stretching to store and retrieve the torch 36, the present invention allows the welding-type torch or gun 36 to be stored in a position that is readily available to an operator standing proximate to the welding-type system 10. Therefore, the operator is not discouraged from properly storing the welding-type torch or gun 36 by the need to bend down, such as in traditional storage systems.

It is also contemplated that the cable management system 12 may be easily removed from the welding-type system 10. As described above, the cable support 24 and support column 16 are mounted to the housing 14 of the welding-type system 10 through the mounting flange 19. The support column 16 is fixed to the mounting flange 19 through one or more screws, bolts, or similar fastening devices 38 that extend through the cable support 24 and the connection shaft 22. By removing the fastening devices 38, the cable support 24 and support column 16 can be pulled upward away from the mounting flange 19 and slide through a passage 39 formed in the bracket 23. In this case, the cable support 24 and support column 16 can be removed and stored separately from the welding-type system 10. The ability to remove the cable support 24 and support column 16 may be particularly advantageous during extended storage or travel on a vehicle, when the welding-type cable 34 and welding-type torch or gun 36 are often disconnected from the welding-type system 10.

Figure 3:
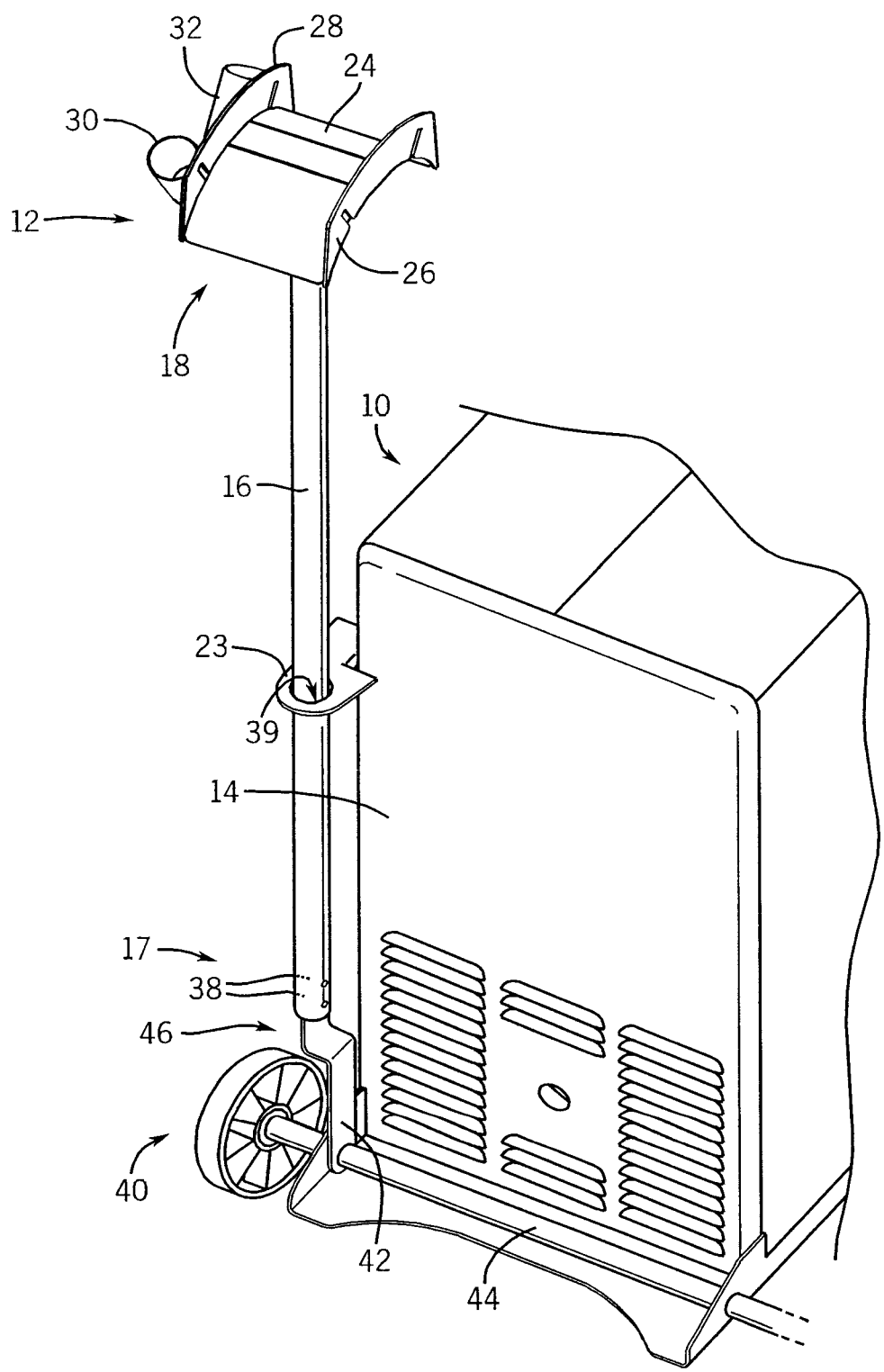
FIG. 3 is a perspective view of the cable management system of FIGS. 1 and 2 engaged with a welding-type system having a wheel system.

Referring now to FIG. 3, it is contemplated that, in some cases, it may be advantageous to mount the cable management system 12 to a welding-type system 10 through an alternative mounting system. For example, if the welding-type system 10 includes a cart or is supported on a wheel system 40, the cable management system 12 may be mounted to the welding-type system through a mounting flange 42 that engages an axle 44 of the wheel system 40. In this case, instead of the above-described connection shaft 22, a connection plate 46 may extend upward from the engagement with the axle 44 and extend into the support column 16 to be engaged by one or more fastening devices 38 that extend through the support column and connection plate 46 to secure the two components together.

Therefore, the above-described system provides a welding-type cable management system that allows an operator to interact with the cable in a more ergonomic position and, thus, encourages the operator to utilize the cable management system. Furthermore, the present invention provides a welding-type cable management system that facilitates storage of a cable in a relatively large coil that is less likely to induce kinks in the cable lining or to cause premature wearing of the cable.

The present invention has been described in terms of the various embodiments, and it should be appreciated that many equivalents, alternatives, variations, and modifications, aside from those expressly stated, are possible and within the scope of the invention. Therefore, the invention should not be limited to a particular described embodiment.

We claim:

1. A cable management system for a welding-type system comprising:
   a housing configured to enclose a power supply;
   an axle coupled to the housing, the axle being configured to support a wheel system;
   a first bracket connected to the housing, the first bracket defining an opening;
   a second bracket connected to the axle, the second bracket includes an elbow and a connection plate extending upwardly from the elbow;
   a support column extending in a first direction from a first end supported by the first bracket to a second end arranged above the housing, the first end of the support column being configured to slide through the opening of the first bracket and defining an opening configured to fit over the connection plate of the second bracket, the first end of the support column being configured to rest against the elbow of the connection plate when the first end of the support column is mounted over the connection plate;
   a fastening device configured to fix the first end of the support column to the connection plate;
   a cable support arranged on the second end of the support column and extending in a second direction substantially transverse to the first direction, wherein the cable support includes a saddle portion configured to receive the cable in a coiled arrangement to hang therefrom;
   wherein at least a portion of the cable support extends away from the welding-type device to allow a cable supported thereon to extend below the cable support and proximate to the welding-type device.

2. The system of claim 1 further comprising a wall extending from the cable support to secure cables supported in the cable support thereon.

3. The system of claim 1 further comprising at least one receptacle supported proximate to the second end of the support column and configured to receive a welding-type torch connected to the cable.

4. The system of claim 1 wherein the cable support is arranged between approximately three and five feet above a base of the welding-type device.

5. The system of claim 1 wherein the welding-type device includes at least one of a welder, a plasma cutter, and an induction heater.

* * * * *